United States Patent
Matsushita et al.

(10) Patent No.: US 6,876,109 B2
(45) Date of Patent: Apr. 5, 2005

(54) CLAW-POLE TYPE STEPPING MOTOR HAVING RADIAL DIMENSION REDUCED WITHOUT DETRIMENT TO PERFORMANCE CHARACTERISTIC

(75) Inventors: Kunitake Matsushita, Shizuoka-ken (JP); Takayuki Yamawaki, Shizuoka-ken (JP); Toshihiko Nagata, Shizuoka-ken (JP); Naoyuki Harada, Shizuoka-ken (JP)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/884,117

(22) Filed: Jul. 2, 2004

(65) Prior Publication Data
US 2005/0006960 A1 Jan. 13, 2005

(30) Foreign Application Priority Data
Jul. 8, 2003 (JP) .................................. 2003-193329

(51) Int. Cl.[7] .......................... H02K 37/14; H02K 5/02; H02K 1/14; H02K 15/02
(52) U.S. Cl. ...................... 310/49 R; 310/257; 310/259
(58) Field of Search .............................. 310/49 R, 257, 310/258, 259, 91, 89

(56) References Cited

U.S. PATENT DOCUMENTS

| | | | | |
|---|---|---|---|---|
| 4,070,592 A | * | 1/1978 | Snowdon et al. | 310/49 R |
| 6,121,712 A | * | 9/2000 | Sakamoto | 310/254 |
| 6,211,585 B1 | * | 4/2001 | Sato et al. | 310/49 R |
| 6,249,066 B1 | * | 6/2001 | Ikegami et al. | 310/49 R |
| 6,552,453 B2 | * | 4/2003 | Ohiwa et al. | 310/68 B |

FOREIGN PATENT DOCUMENTS

| | | | | |
|---|---|---|---|---|
| JP | 06261506 A | * | 9/1994 | 310/49 R |
| JP | 2003-009499 | | 1/2003 | |

* cited by examiner

Primary Examiner—Tran Nguyen
(74) Attorney, Agent, or Firm—Wallenstein Wagner & Rockey, Ltd.

(57) ABSTRACT

A claw-pole type stepping motor comprises: a rotor which is shaped substantially cylindrical, and which has a rotary shaft at its radial center; and two stators which are shaped like a cup, each have at least one magnetic coil, are coupled to each other so as to rotatably house the rotor with their magnetic coils located respectively toward both axial end faces of the rotor, and which each have two pole tooth arrays magnetically connected to each other such that magnetic phase difference therebetween at tips of respective pole teeth is 180 degrees in terms of electrical angle, and in the motor thus structure, three pipes of aluminum go axially through the two stators so as to hold together the two stators.

3 Claims, 9 Drawing Sheets

CLAW-POLE TYPE STEPPING MOTOR HAVING RADIAL DIMENSION REDUCED WITHOUT DETRIMENT TO PERFORMANCE CHARACTERISTIC

This application priority from Japan Application No.2003-193329, filed Jul. 8, 2003 (incorporated by reference herein).

BACKGROUND OF THE INVENTION

1. Field of the Invention

The present invention relates to a claw-pole type stepping motor, and particularly to a structure of a claw-pole type stepping motor, which enables reduction in radial dimension and improvement in performance characteristic.

2. Description of the Related Art

Due to increasing demand for miniaturization of various electronics devices, motors used in the electronics devices are also requested to be downsized increasingly. In a conventional claw-pole type stepping motor of inner rotor structure, magnetic coils of A phase and B phase are typically disposed so as to circumferentially surround a rotor. In such a claw-pole type stepping motor, the outer diameter of a rotor magnet is restricted by the inner diameter of a stator. Accordingly, a rotor magnet in a motor with a small radial dimension is forced to be small in diameter, and therefore the motor characteristic is inevitably degraded significantly. In such a case, a brushless DC motor provided with an encoder as a position detector must be used for position control in place of a claw-pole type stepping motor, and this invites cost increase.

In order to overcome the difficulties described above, Japanese Patent Application Laid-Open No. 2003-009499 teaches a structure of a claw-pole type stepping motor, in which magnetic coils are isolated from each other and disposed respectively toward the both axial end faces of a rotor so as to axially sandwich the rotor. With such a structure, a claw-pole type stepping motor having a diameter of about 6.0 mm or less can be produced with a practical performance characteristic maintained. Such a small motor, however, is very difficult and troublesome to assemble just because of its reduced radial dimension and resultantly increased axial dimension, especially when a large number of components are used.

SUMMARY OF THE INVENTION

The present invention has been made in light of the problem described above, and it is an object of the present invention to provide a structure of a claw-pole type stepping motor, which reduces difficulty and troublesomeness in assembling work, and which enables reduction of the motor diameter without detriment to the motor performance characteristic.

In order to achieve the object, according to one aspect of the present invention, a claw-pole type stepping motor is structured by comprising: a rotor which is shaped substantially cylindrical, and which has a rotary shaft; and two stators which are each shaped like a cup, each have at least one magnetic coil, are coupled to each other so as to rotatably house the rotor with their magnetic coils located respectively located toward the both axial end faces of the rotor, and which each have two pole tooth arrays magnetically connected to each other such that magnetic phase difference therebetween at tips of respective pole teeth is 180 degrees in terms of electrical angle, and in the motor thus structured, at least one pin goes axially through the two stators. Since the two stators can be duly held together in place by means of the at least one pin, the motor assembling work can be eased and improved in spite of its increased axial dimension. Also, since the two stators can be held together in place by means of the at least one pin, an outer ring conventionally required for holding together the two stators is eliminated whereby the radial dimension of the motor can be reduced without sacrificing the motor performance characteristic.

In the one aspect of the present invention, the both ends of the at least one pin may be riveted. Consequently, the two stators can be fixedly and securely held together thereby further improving the motor assembling work.

In the one aspect of the present invention, the at least one pin may be hollow. Consequently, the riveting work can be duly accomplished easily with a light force thereby further easing the motor assembling work.

DETAILED DESCRIPTION OF THE PREFERRED EMBODIMENT

An embodiment of the present invention will hereinafter be described with reference to the accompanying drawings.

Figure 1:
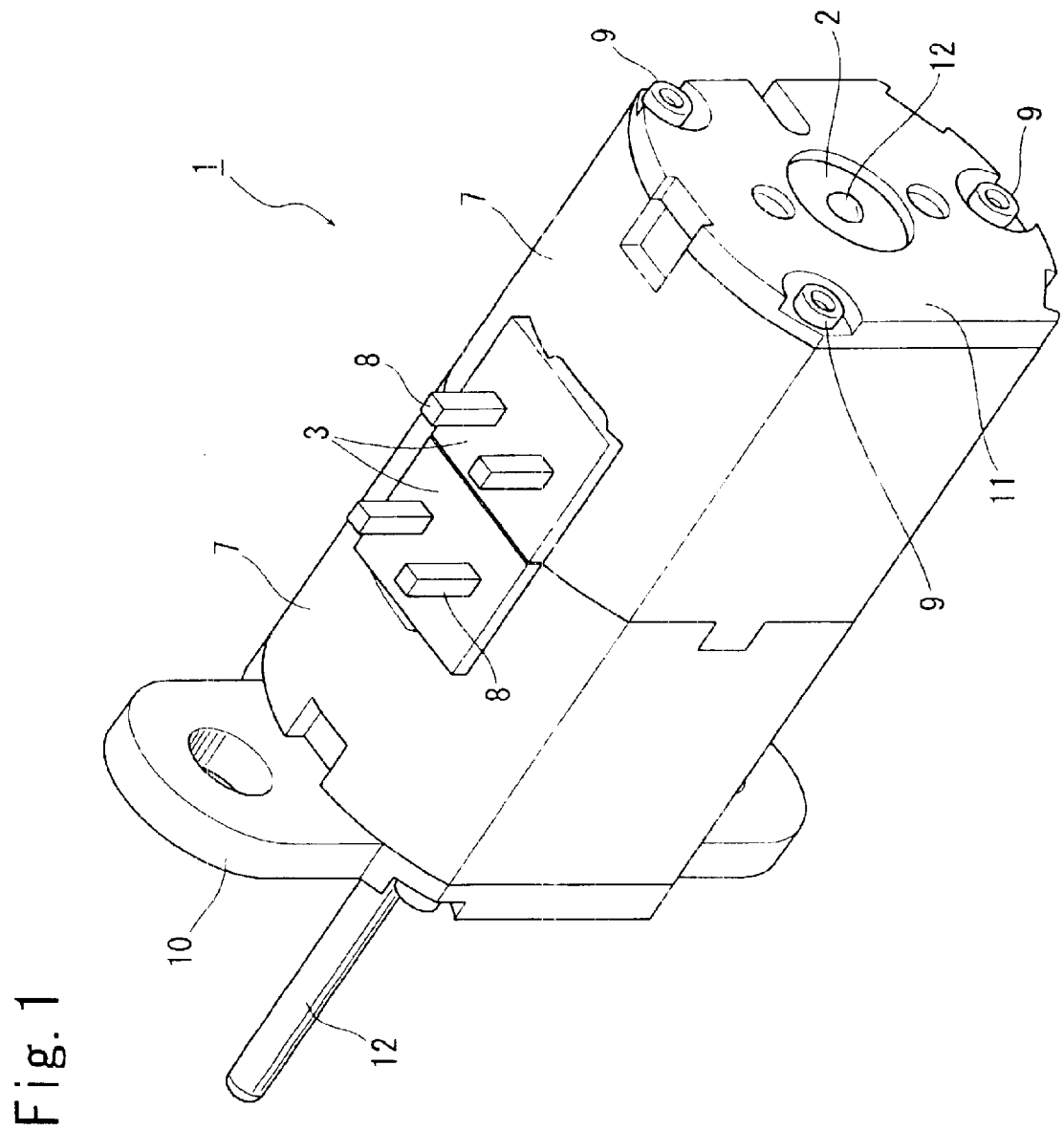
FIG. 1 is a perspective view of a claw-pole type stepping motor according to an embodiment of the present invention.
Figure 2:
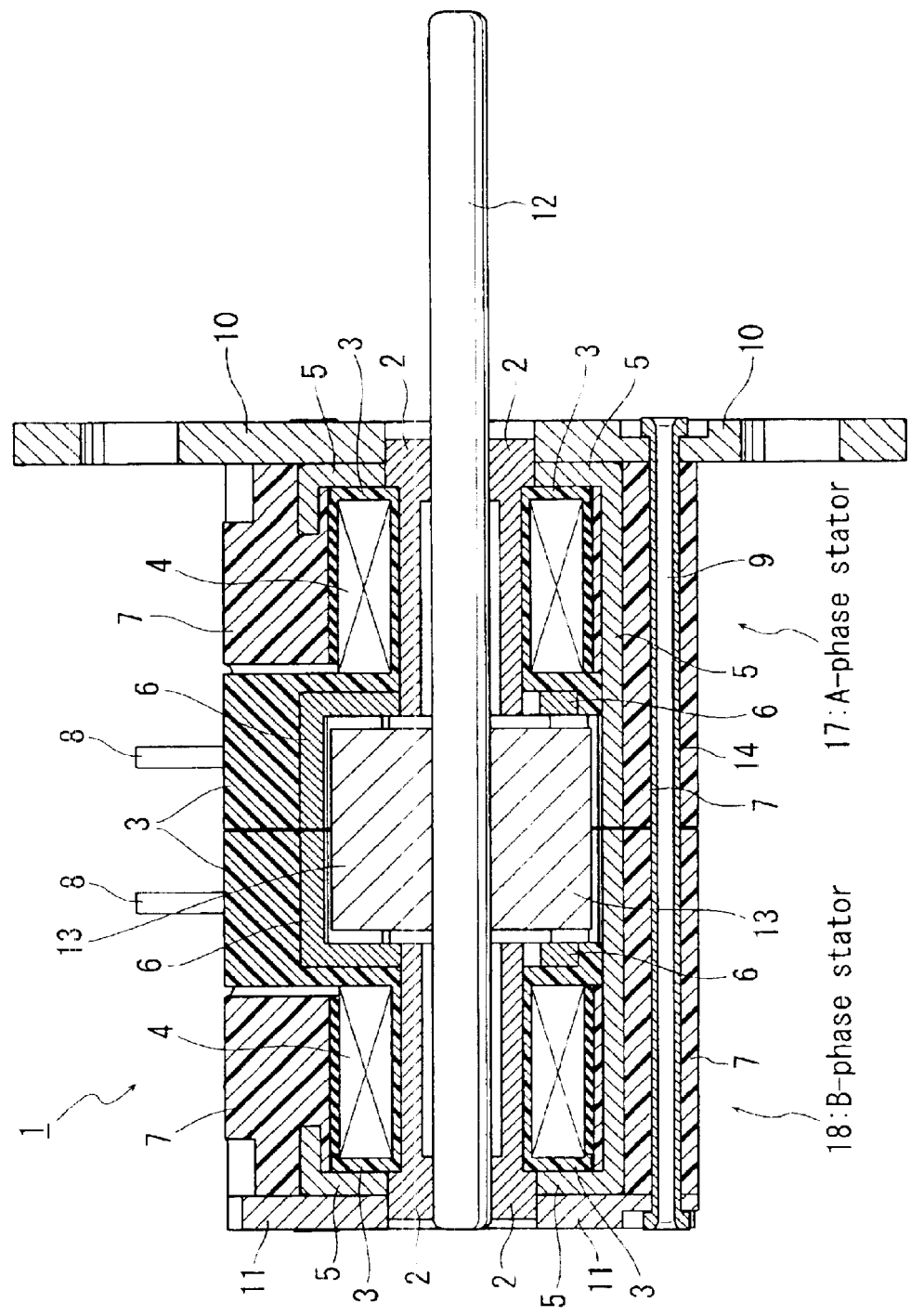
FIG. 2 is a schematic axial cross-sectional view of the claw-pole type stepping motor of FIG. 1.

A claw-pole type stepping motor 1 according to the embodiment of the present invention is shown in FIG. 1. Referring now to FIG. 2, the claw-pole type stepping motor 1 basically comprises: a rotor composed of a rotary shaft 12, and a rotor magnet 13 made of, for example, a cylindrical magnetic material; and A-phase and B-phase stators 17 and 18 including respective magnetic coils 4 and coupled to each other with their magnetic coils 4 located respectively toward the both axial end faces of the rotor magnet 13. The A-phase and B-phase stators 17 and 18 may be composed of common components so as to be constructed identical with each other, whereby production cost of the components can be reduced.

The rotor is rotatably housed in the A-phase and B-phase stators 17 and 18 such that the rotor magnet 13 is axially sandwiched by the magnetic coils 4 as shown in FIG. 2, and is circumferentially surrounded by pole teeth (to be described later). Thus, the claw-pole type stepping motor 1 is structured such that two cup-shaped stators are coupled to each other so as to rotatably house a rotor having a rotary shaft. The A-phase and B-phase stators 17 and 18 each comprise first and second stator yokes 5 and 6, a bearing 2, and a coil bobbin 3 having the aforementioned magnetic coil 4 wound therearound. The first and the second stator yokes 5 and 6 each have a plurality of pole teeth as described later, and are magnetically connected to each other such that magnetic phase difference therebetween at the tips of their respective pole teeth is 180 degrees in terms of electrical angle.

Figure 3:
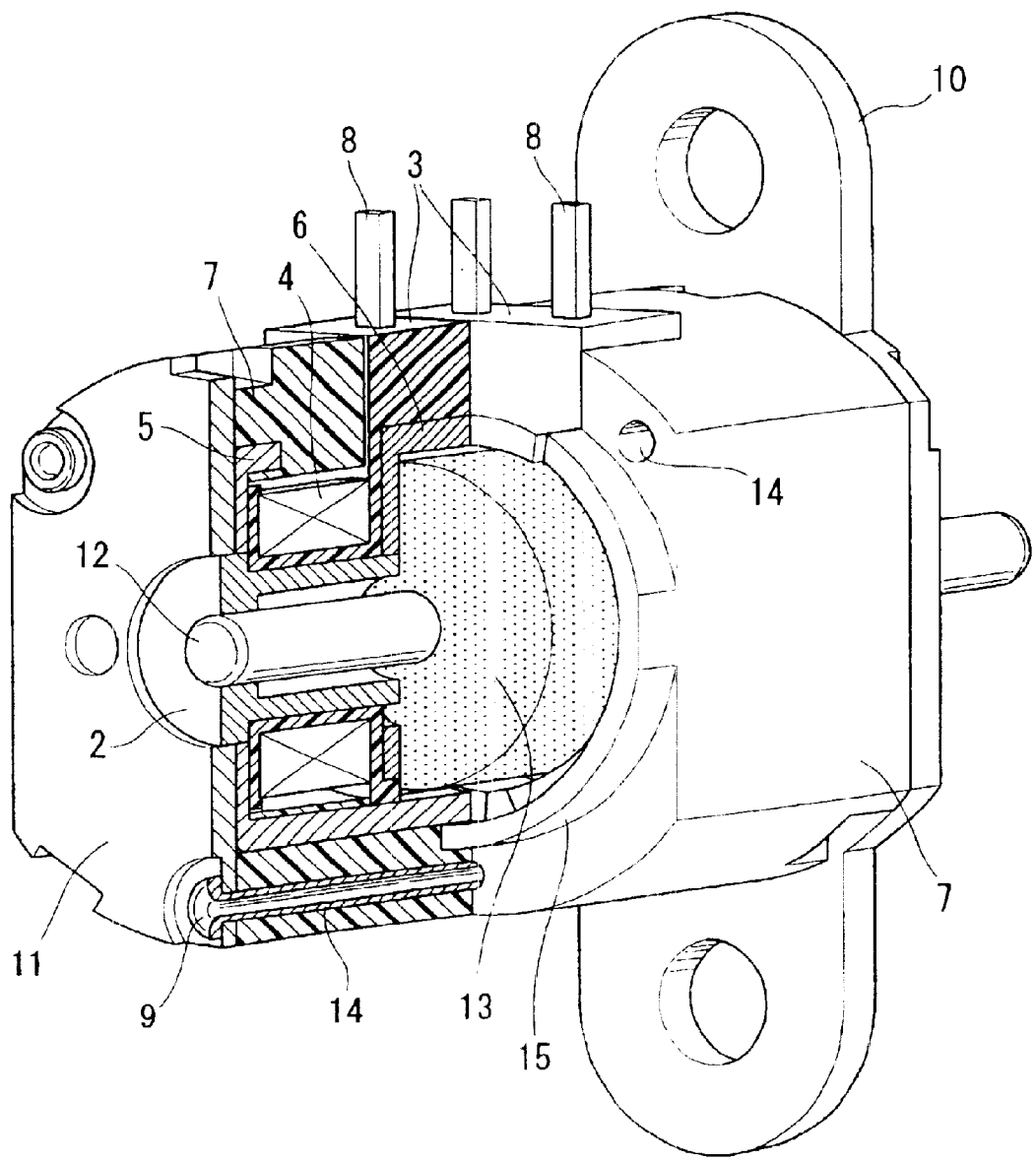
FIG. 3 is a partly sectioned away perspective view of the claw-pole type stepping motor of FIG. 1.

Referring to FIGS. 2 and 3, the claw-pole type stepping motor 1 further comprises: two of the aforementioned bearings 2 to rotatably support the rotary shaft 12; two resin-molded structures 7 to fixedly position the components constituting the stators; terminals 8 to supply current to respective coils 4; a front plate 10; a rear plate 11; and three pins (in the embodiment, the pins are hollow and hereinafter referred to as "pipes") 9 passing through respective holes 14 which run through the front plate 10, the A-phase and B-phase stators 17 and 18, and the rear plate 11. The front and rear plates 10 and 11 may be made of steel such as SECC.

Figure 4:
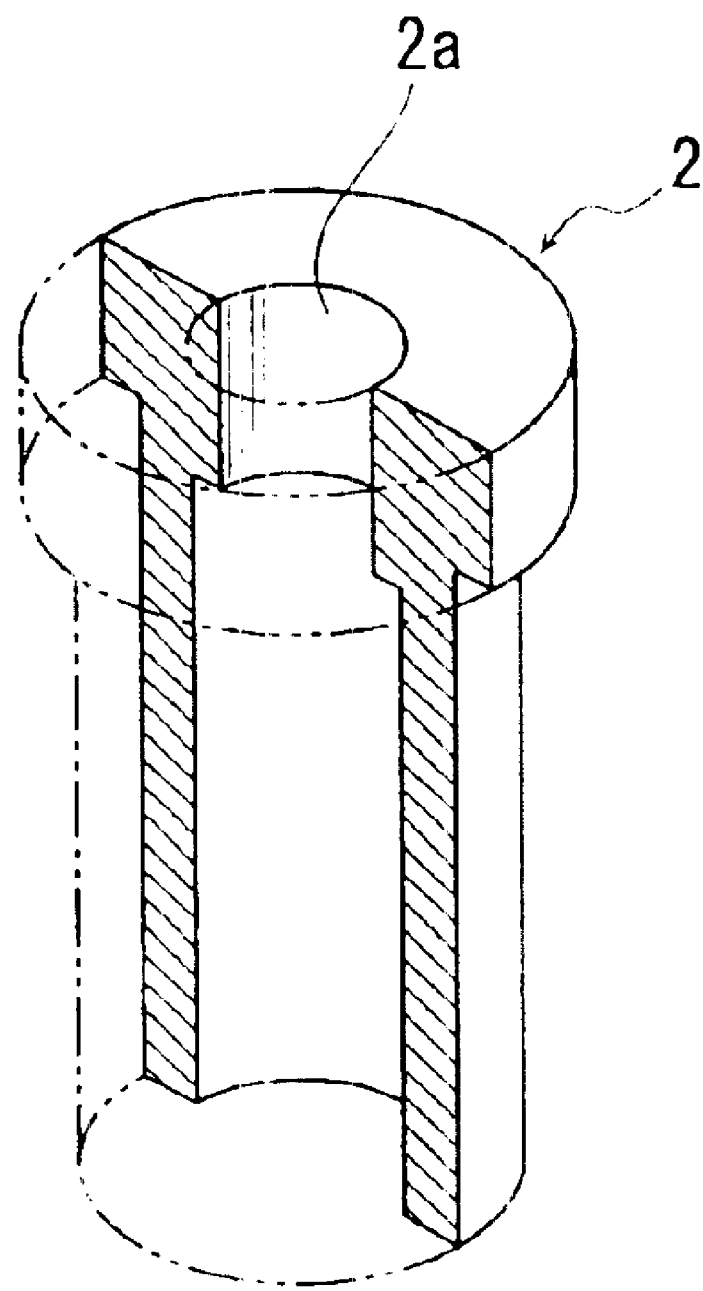
FIG. 4 is a perspective cross-sectional view of a bearing shown in FIGS. 2 and 3.

Referring to FIG. 4, each bearing 2 has a shaft hole 2a, through which the rotary shaft 12 is inserted. As shown in FIG. 2, the A-phase and B-phase stators 17 and 18 have respective bearings 2. The bearings 2 are made of magnetic steel sintered and oil-impregnated. Each of the bearings 2 made of a magnetic material is in contact with both the first and second stator yokes 5 and 6 thereby magnetically connecting their respective pole teeth 5c and 6c mentioned above, and the oil impregnation allows the rotary shaft 12 to rotate smoothly.

In the motor structure disclosed in the aforementioned Japanese Patent Application Laid-Open No. 2003-009499, two sleeves made of a magnetic material separately from a bearing are each used to magnetically connect two sets of pole tooth arrays, while the motor structure according to the present invention uses bearings each including integrally a sleeve portion as described above thus contributing to decreasing the number of components. Bearings made of magnetic steel sintered and oil-impregnated are disclosed in Japanese Patent Applications Laid-Open Nos. H07-310101 and H09-143638.

Figure 5:
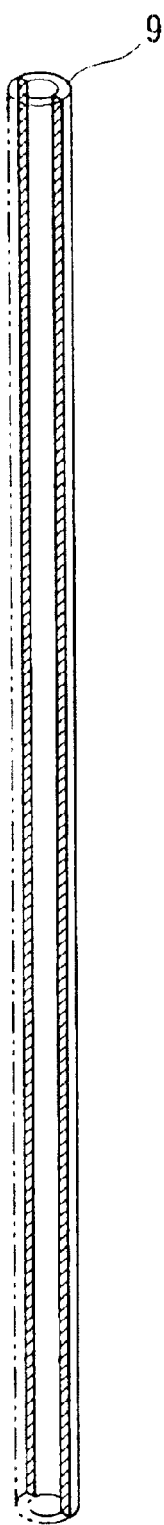
FIG. 5 is a perspective cross-sectional view of a pipe shown in FIGS. 2 and 3.

FIG. 5 is a perspective cross-sectional view of one of the pipes 9 which are inserted through the respective holes 14 running through the front plate 10, the A-phase stator 17, the B-phase stator 18, and the rear plate 11 as described above with reference to FIGS. 2 and 3, whereby those components can be fixedly held together in place. The pipes 9 have an inner diameter of about 0.3 mm and an outer diameter of about 0.5 mm, and may be made of, for example, aluminum. The both ends of each pipe 9 are riveted after the pipe 9 is inserted through the hole 14. Since the pipe 9 is of a hollow structure, the riveting work can be duly accomplished with a light force, which contributes to easing the assembling work.

In the conventional motor structure which is similar to the structure according to the present invention, but which, unlike the present invention, is not provided with the pin/pipe-and-hole mechanism described above, while its radial dimension is reduced without sacrificing its motor characteristic and performance, its inevitably increased axial dimension causes such a problem that the axes of A-phase and B-phase stators are difficult to correctly and fixedly align with each other and are apt to be tilted relative to each other even if the both stators are attached to each other by means of, for example, adhesive. In the embodiment discussed above, three of the pipes 9 are inserted respectively through three of the holes 14, but the present invention is not limited thereto, but alternatively one, two, four or more of the pipes 9 and the holes 14 may be provided.

In the motor structure disclosed by the aforementioned Japanese Patent Application Laid-Open No. 2003-009499, an outer ring is used for holding together components in place, but in the motor structure according to the present invention, since the pipes 9 are used for holding together components, the outer ring is not required. Though the number of components in the above-described particular embodiment of the present invention may be increased compared with the aforementioned conventional motor structure (three pipes 9 against one outer ring), the motor according to the present invention, when assembled in such a manner that some of the pole teeth of the first and second stator yokes 5 and 6 are exposed, can have its radial dimension reduced with respect to a certain direction for up to twice the thickness of the outer ring material without sacrificing its performance characteristic. In this connection, the number of the pipes 9 can be reduced to one as described so as to prevent the increase of the number of components. Further, if the mounting space does not require reduction of the motor size, then the diameters of the first and second stator yokes 5 and 6, and the rotor magnet 13 are allowed to be increased whereby the performance characteristic can be enhanced while the outer dimension of the motor remains unchanged.

The embodiment of the present invention will be further discussed in detail by describing the procedures for assembling the claw-pole type stepping motor 1.

Figure 6:
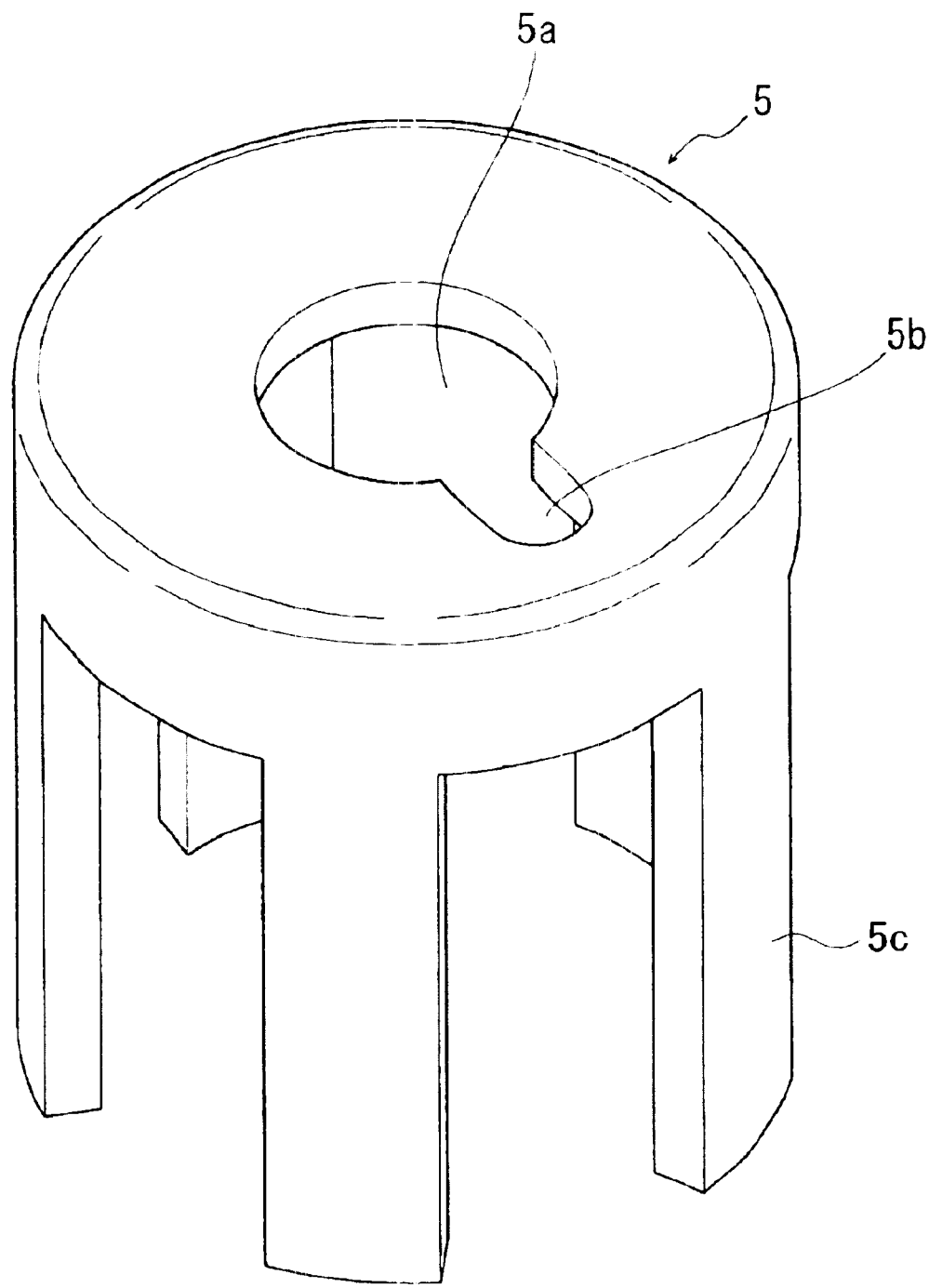
FIG. 6 is a perspective view of a first stator yoke shown in FIGS. 2 and 3.

Referring to FIG. 6, the first stator yoke 5 is structured substantially cylindrical as a whole, comprises a disk-shaped portion having a center hole 5a with a cutout 5b, and a plurality (five in the figure) of pole teeth 5c, and may be formed of a soft magnetic steel sheet, such as SECC, silicon steel, SUY, and the like.

Figure 7:
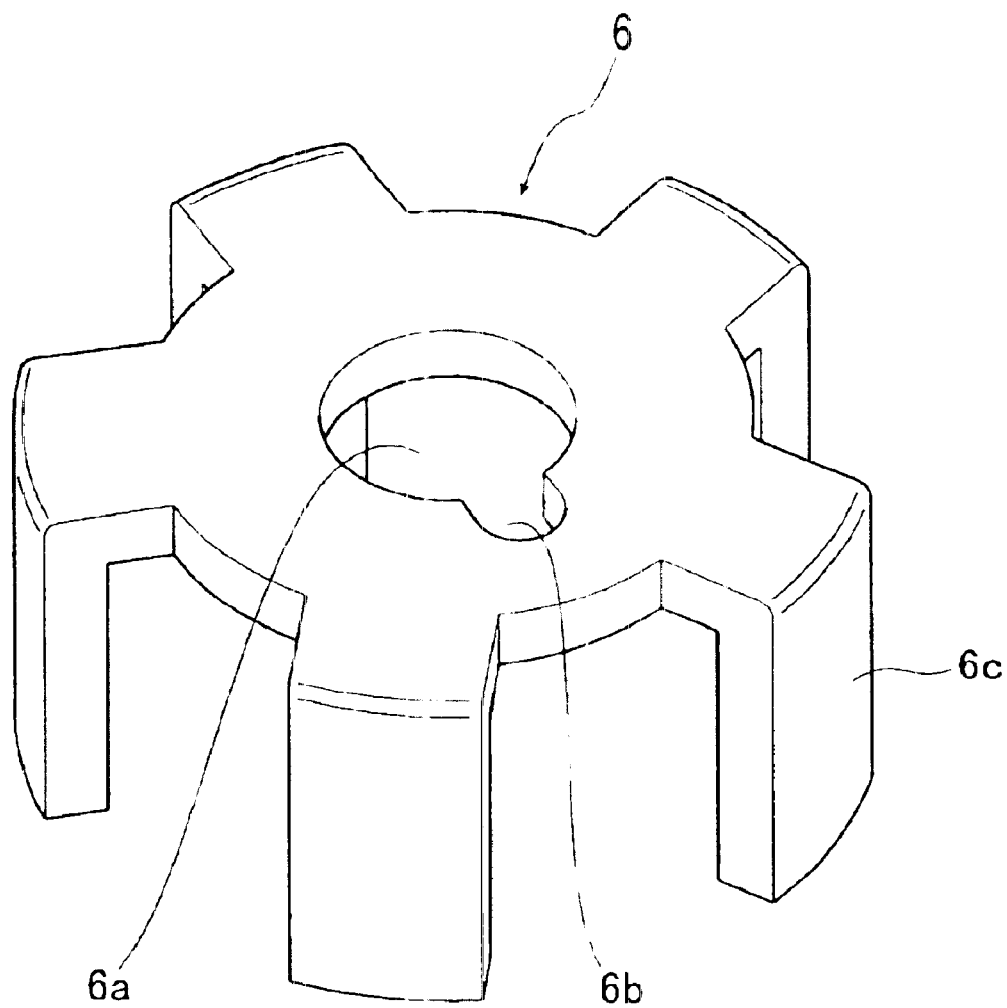
FIG. 7 is a perspective view of a second stator yoke shown in FIGS. 2 and 3.

Referring to FIG. 7, the second stator yoke 6 is structured substantially cylindrical as a whole, comprises a disk-shaped portion having a center hole 6a with a cutout 6b, and a plurality (five in the figure) of pole teeth 6c, and may be formed of a soft magnetic steel plate, such as SECC, silicon steel, SUY, and the like.

Figure 8:
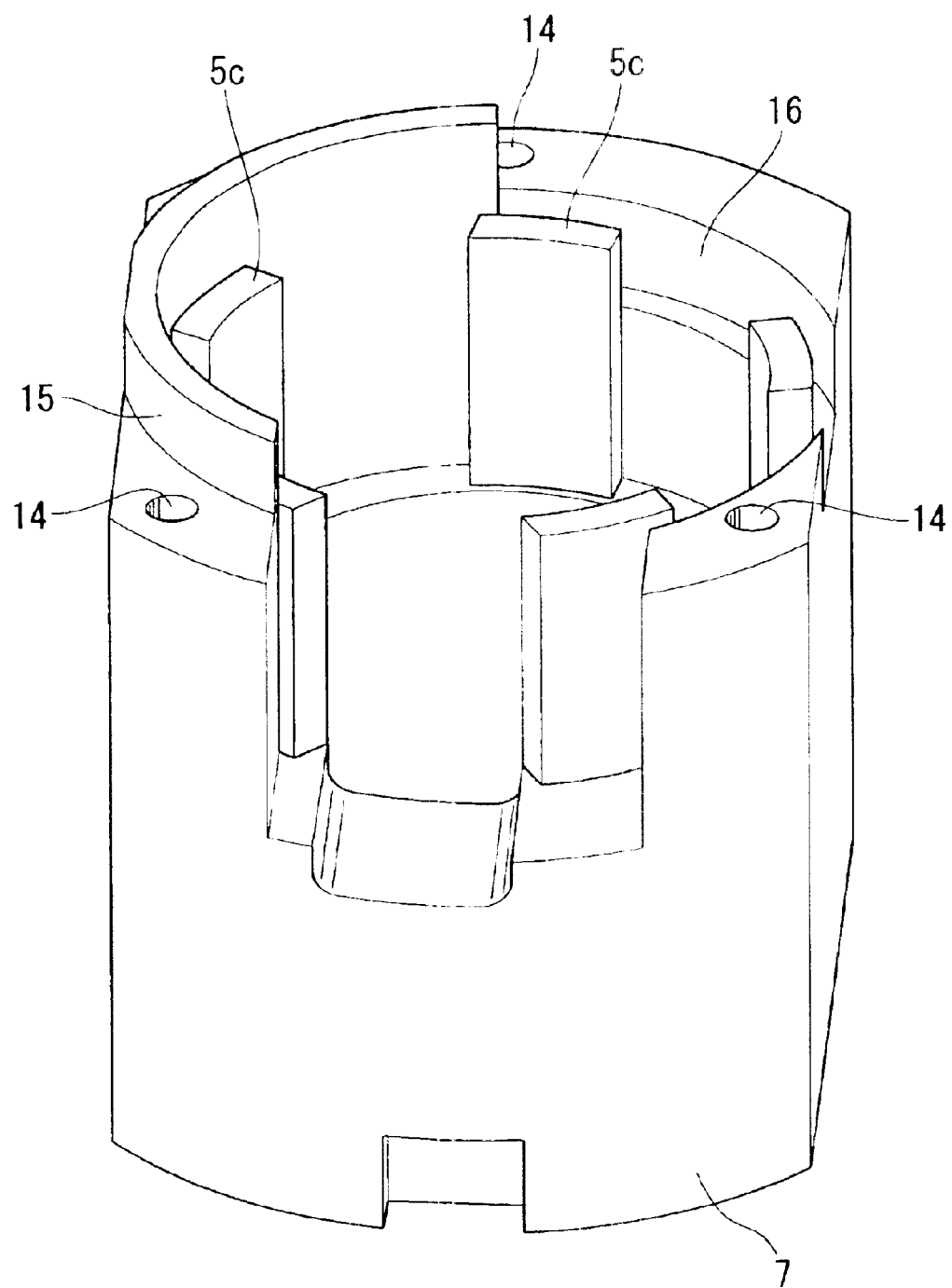
FIG. 8 is a perspective view of the first stator yoke of FIG. 6 in a molded state.

Referring to FIG. 8, the first stator yoke 5 is resin-molded so as to form the resin-molded structure 7 integrated therewith. The resin-molded structure 7 may be formed of polybutylene terephthalate, liquid crystal polymer, or the like. When the first stator yoke 5 is resin-molded, the cutout 5b thereof is set to a protrusion of a mold die thereby positioning the first stator yoke 5, thus positioning the pole teeth 5c in the resin-molded structure 7. At this molding process, the holes 14, a semi-annular protrusion 15, and a semi-annular groove 16 are formed. The semi-annular protrusion 15 and the semi-annular groove 16 formed on the A-phase stator 17 engage respectively with the semi-annular groove 16 and the semi-annular protrusion 15 formed on the B-phase stator 18 so that the A-phase and B-phase stators can be fixedly attached to each other without shifting from each other in radial and circumferential directions. The resin-molded structure 7 does not have to be shaped in its axial cross section as shown in the embodiment, but may alternatively be otherwise shaped.

Figure 9:
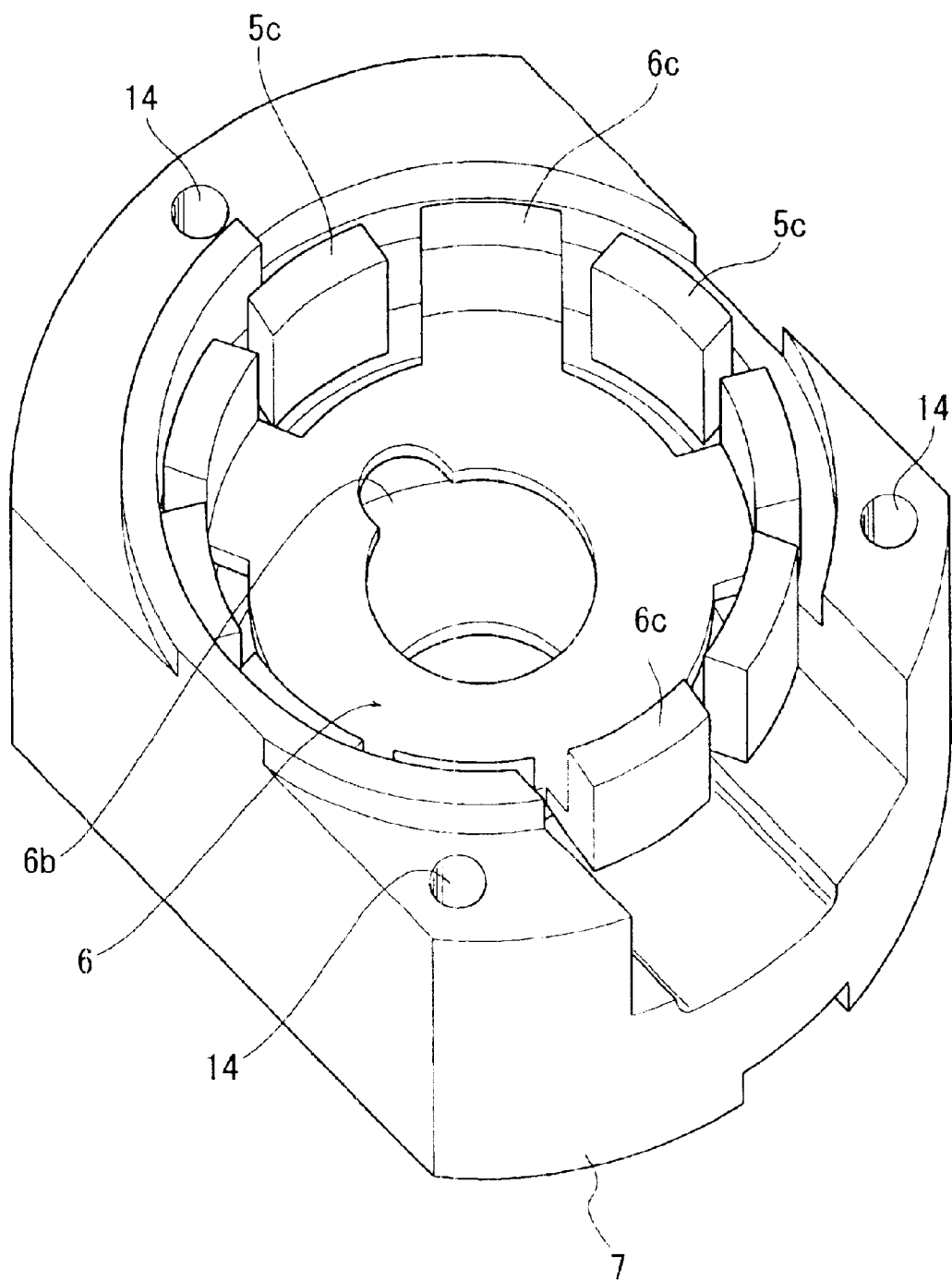
FIG. 9 is a perspective view of the molded first stator yoke of FIG. 8 having the second stator yoke of FIG. 7 assembled therewith.

Referring to FIG. 9, a preassembled workpiece, which comprises the coil bobbin 3 having the coil 4 wound therearound, the bearing 2, and the second stator yoke 6, is put inside the resin-molded structure 7 formed integrally with the first stator yoke 5 as described above. In FIG. 9, the coil bobbin 3 with the coil 4, and the bearing 2 are omitted for viewing convenience. The second stator yoke 6 is circumferentially positioned with respect to the first stator yoke 5 by means of the cutout 6b. The bearing 2 may be fitted through the center hole 6a of the second stator yoke 6, the coil bobbin 3, and also the center hole 5a of the first stator yoke 5 by, for example, press-fitting, and may be fixed adhesively if required.

The rotor, which comprises rotary shaft 12 and the rotor magnet 13, is put between the A-phase and B-phase stators 17 and 18 each assembled as described above, and the A-phase and B-phase stators 17 and 18 are attached to each other such that the semi-annular protrusion 15 and the semi-annular groove 16 of the A-phase stator 17 engage respectively with the semi-annular groove 16 and the semi-annular protrusion 15 of the B-phase stator 18. Then, the front plate 10 and the rear plate 11 are attached, the pipes 9 are inserted through the holes 14, and the ends of each pipe 9 are riveted for fixedly holding together the front plate 10, the A-phase stator 17, the B-phase stator 18, and the rear plate 11. Since the pipe 9 has a hollow structure with an outer diameter of about 0.5 mm and an inner diameter of about 0.3 mm, the ends thereof can be riveted easily with a light force. The claw-pole type stepping motor 1 thus completed is shown in FIG. 1.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A structure of a claw-pole stepping motor comprising:

a rotor which is shaped substantially cylindrical, and which has a rotary shaft at its radial center;

two stators which are formed as cup-shape, each have at least one magnetic coil, are coupled to each other so as to rotatably house the rotor with their magnetic coils located respectively toward both axial end faces of the rotor, and which each have two pole tooth arrays magnetically connected to each other such that magnetic phase difference therebetween at tips of respective pole teeth is 180 degrees in terms of electrical angle; and at least one pin which goes axially through the two stators so as to hold together the two stators.

2. A structure of a claw-pole stepping motor according to claim 1, wherein both ends of the at least one pin are riveted.

3. A structure of a claw-pole stepping motor according to claim 2, wherein the at least one pin is hollow.

* * * * *